(12) United States Patent
Domken

(10) Patent No.: US 6,364,320 B1
(45) Date of Patent: *Apr. 2, 2002

(54) WORK HEAD FOR A MACHINE FOR SHAPING OBJECTS

(75) Inventor: Iwan Domken, Thimister-Clermont (BE)

(73) Assignee: Euromatic S.r.l., Treviglio (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,691

(22) Filed: Jul. 31, 1998

(30) Foreign Application Priority Data

Jul. 31, 1997 (EP) ............................. 97870114

(51) Int. Cl.[7] ................................. B23B 5/22
(52) U.S. Cl. ................. 279/107; 279/114; 279/110; 279/109; 29/743; 29/DIG. 44
(58) Field of Search ................. 279/106, 107, 279/108, 109; 451/379, 385, 366, 377

(56) References Cited

U.S. PATENT DOCUMENTS

| 2,712,449 | A | * | 7/1955 | Grobey | 279/106 |
| 3,456,956 | A | * | 7/1969 | Herbkersman | 279/4 |
| 4,342,348 | A | * | 8/1982 | Lichtenwalter | 144/209 |
| 4,523,766 | A | * | 6/1985 | Dettmer | 279/4 |
| 4,856,797 | A | * | 8/1989 | Rall | 279/41 |

FOREIGN PATENT DOCUMENTS

| FR | 1076285 | 10/1954 |
| FR | 63 907 | 10/1955 |
| FR | 2 418 054 | 9/1979 |
| FR | 2 540 017 | 4/1984 |
| GB | 2 065 095 | 6/1981 |

* cited by examiner

*Primary Examiner*—Peter Vo
*Assistant Examiner*—Sean Smith
(74) *Attorney, Agent, or Firm*—Sughrue Mion, PLLC

(57) ABSTRACT

A work head for a machine for shaping objects. The work head has pincher elements actuated by an operating member which is, mounted to slide coaxially inside the body of the work head, and which is hollow to allow the passage of a tube or object that is to be shaped. The pincher elements may be made of a single piece consisting of a pincher arm and an operating arm.

8 Claims, 2 Drawing Sheets

WORK HEAD FOR A MACHINE FOR SHAPING OBJECTS

BACKGROUND OF THE INVENTION

The present invention relates to machines for shaping objects made of glass or some other material and relates in particular to a work head for these machines which is very precise and very robust.

At the present time, ever increasing precision is being demanded of glassware intended, for example, for pharmaceutical laboratories. Now, this quality goes hand in hand with the precision of the components of the machine that manufactures these products and more particularly the gripper which holds these glass objects while they are being shaped.

Most current work heads for these handling operations comprise pincher fingers articulated to the body of the head and actuated by an operating member sliding along and on the outside of the body of the head. The great drawback with this type of head is that the bearing which holds the head is relatively distant from the end of the head because the very design of these heads means that the member for operating the pincher fingers and its return spring have to be fitted between the head and the bearing. In consequence, errors in the manufacture of the rolling bearings of the bearing, and errors in the machining of the various constituent parts of the head are amplified by the lever arm phenomenon.

Another drawback with this type of work head is that the pincher fingers are pinched onto the pivots by binding screws. Vibrations of the machine or a chance blow to a pincher finger have the effect of decalibrating the gripping of an object that is being handled. This constant decalibration of the pincher fingers costs the users of machines equipped with this type of head dearly, not only in terms of the scrapping of defective products completed before the technician noticed the defect with the head in question, but also in terms of machine downtime and the cost of labor for repairing this head.

SUMMARY OF THE INVENTION

The object of the present invention is to overcome these drawbacks which result in numerous machine stoppages for repair and recalibration of the gripper so that the production quality can be kept within acceptable standards.

This object is achieved, in accordance with the invention, by virtue of a work head as defined in the claims.

More specifically, a first feature of the device according to the invention lies in the fact that the member for operating the pincher elements and its return spring are mounted inside the body of the head. In this way, the bearing that holds the gripper head is very close to the end of the head, this making it possible to avoid the phenomenon of amplifying the errors in the machining of the constituent parts of the pincher elements. Furthermore, the operating member is hollow to allow the passage of a tube or object that is to be shaped.

A second feature of the invention lies in the fact that each pincher element consists of just one single piece, this preventing any relative displacement of the two arms of the pincher element.

A third feature of the invention lies in the fact that each pincher element can be adjusted individually by a set screw which presses directly on the operating member. Thanks to this adjustment of the pincher elements, it is possible for the product gripped in the head to be perfectly centered.

A fourth feature of the invention lies in the fact that each head and its bearing form a unit which can be removed from the machine as a single entity so that the head can be calibrated on a bench and thus avoid extensive downtime of the production machine.

The features and advantages of the invention will emerge more clearly from the appended drawings and the description which follows.

DETAILED DESCRIPTION OF THE PREFERRED EMBODIMENTS

Figure 2:
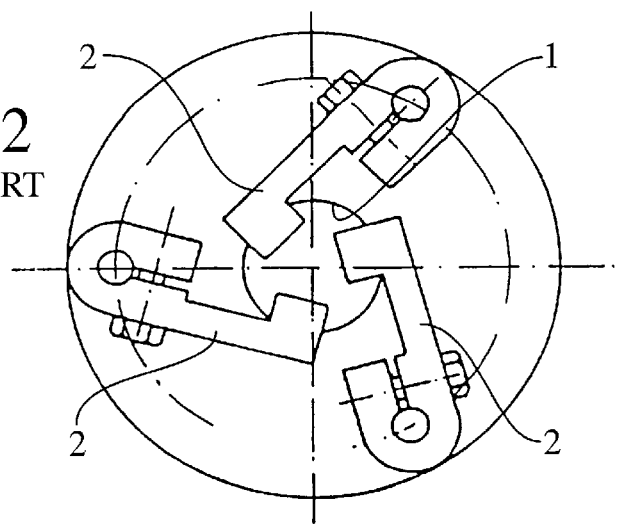
FIGS. 1 and 2 illustrate a type of known head for gripping objects, FIG. 1 showing a partial axial section and FIG. 2 being a view from below.
Figure 1:
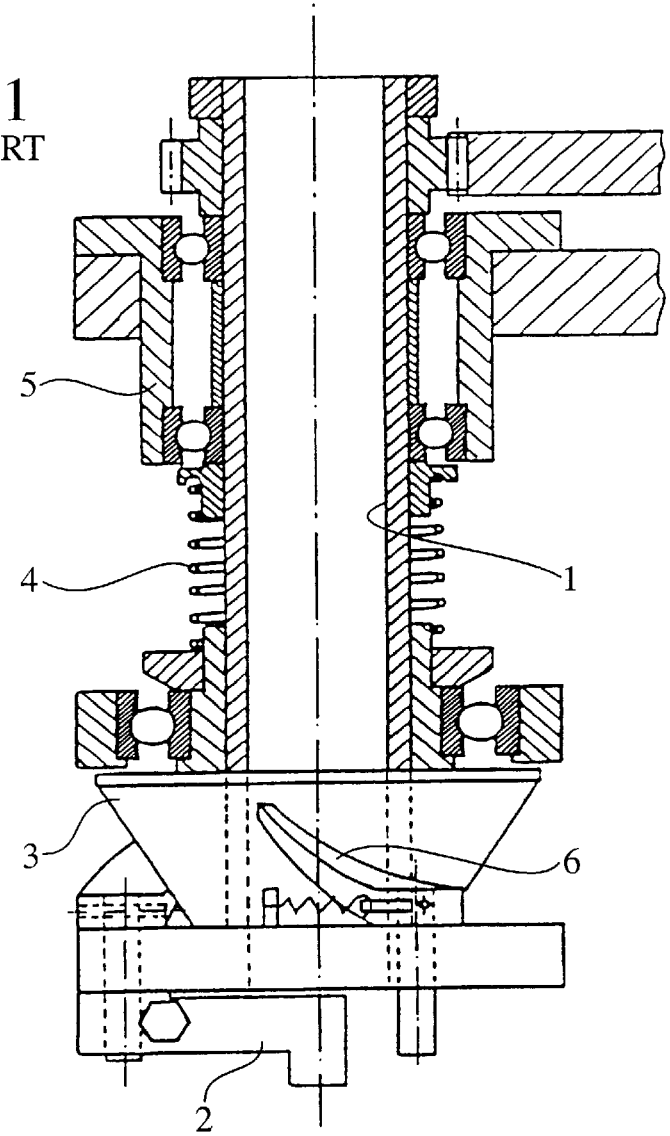

FIGS. 1 and 2 show the construction of a typical work head according to the known art. The numeral 1 denotes the body of the head, the numeral 2 denotes each of the pincher fingers and the numeral 3 denotes the member for opening and closing the pincher fingers 2 via levers 6. It can be seen that the operating member 3 is mounted coaxially on the outside of the body of the head. The pincher fingers 2 are made to move by sliding the operating member, along the body of the head. As mentioned earlier, the very design of this work head requires the operating member 3 and its return spring 4 to be fitted between the end of the body 1 carrying the pincher fingers 2 and the bearing 5 which holds the body of the head, this leading to the drawbacks mentioned in the foregoing.

Figure 4:
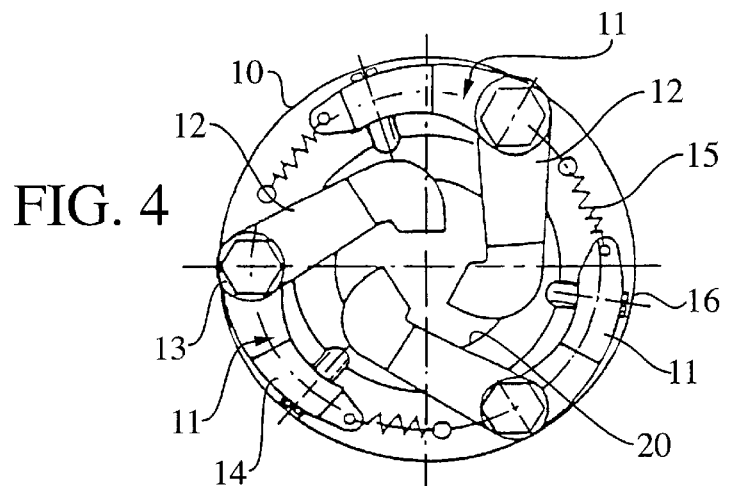
FIG. 4 is a view from below of the gripper head of FIG. 3.
Figure 3:
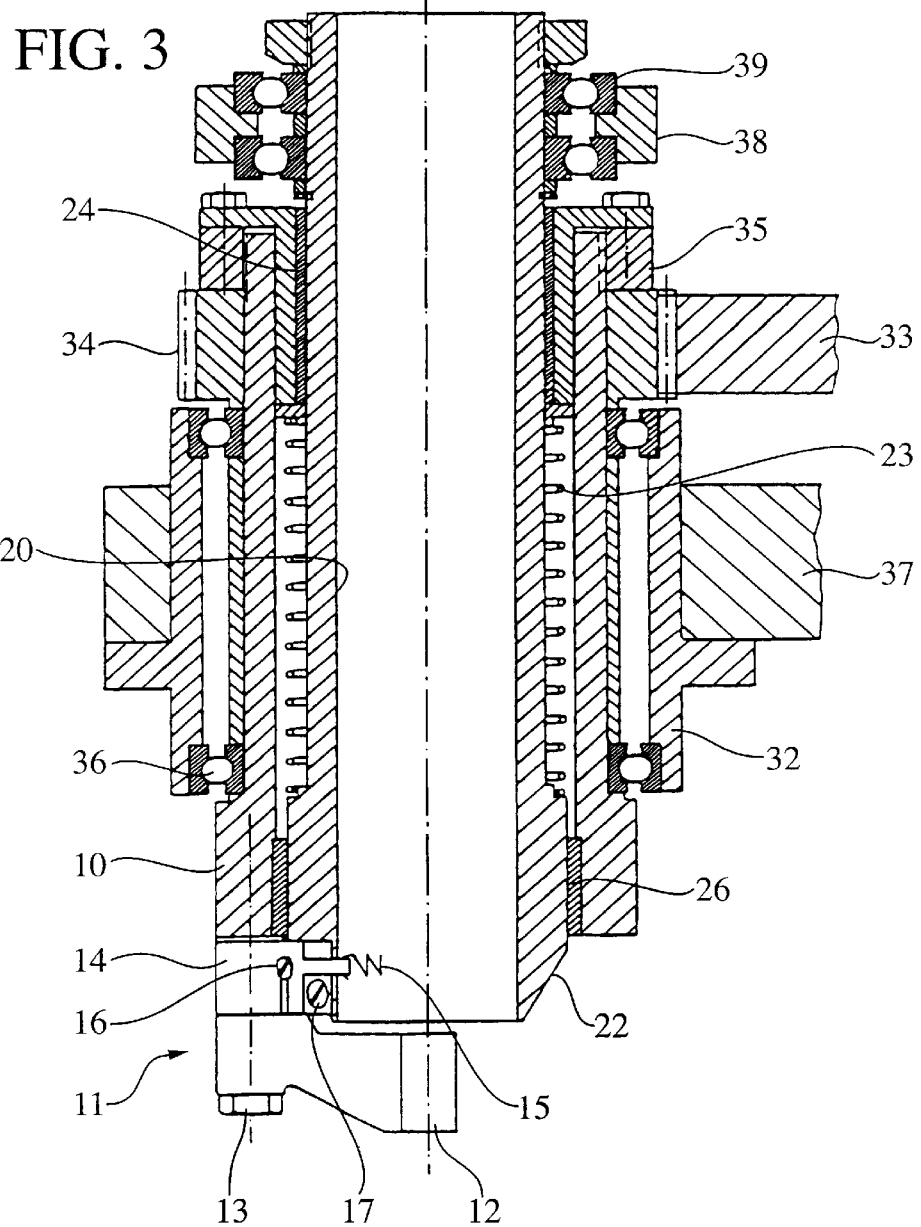
FIG. 3 slows a partial axial section of an object-gripper head in accordance with the invention.

Referring now to FIGS. 3 and 4, these depict an exemplary embodiment of a work head in accordance with the invention. The head comprises a cylindrical body 10 and is equipped with three pincher elements 11 pivoting on pivots 13. Just one pincher element is depicted in FIG. 3. Each of the pincher elements comprises a pinching arm 12 and an operating arm 14. The operating arm 14 bears a screw 16 which presses on a frustoconical guide surface 22 borne by a hollow support cylinder 20 allowing the passage of a tube or object that is to be shaped, for example a tube or object made of glass, and used to open and to close the pinching arm 12. The screw 16 allows the position of the corresponding pinching arm 12 to be adjusted exactly. As soon as this position has been perfectly set, the screw 16 is locked in position using a binding screw 17. Each pinching arm is kept resting against the guide surface 22 by a spring 15.

The support cylinder 20 can slide axially in bushings 24 and 26 inside the body 10 of the head. The unit is held in a bearing 32 fixed to the main structure 31 of a machine for handling an object and which contains the two rolling bearings 36 in which the body 10 of the head is inserted.

The work head is rotated by an operating pinion 33 which drives a pinion 34 of the head. The head 10 and the pinion 34 are held in their rolling bearings 36 by the locking of the nut 35.

The pincher elements are opened by relative displacement of the guide surface 22 with respect to the body 10 of the head. In the example of FIG. 3, the pincher elements open when the guide surface 22 is displaced toward the inside of the head by the support 20 sliding inside the body of the head. This sliding is brought about by pulling on the ring 38 which, via the bearings 39, is connected to the support 20 of the guide surface 22. The retraction of the guide surface 22 causes the set screw 16 to advance toward the inside under the action of the spring 15 and thus displaces the operating arm 14 of each pincher element. As the arms 14 pivot toward the inside of the head, the pinching arms 12 pivot toward the outside of the head. The pinching arms 12 close automatically under the action of a spring 23 which pushes the support 20 of the guide surface 22 axially toward the outside of the head, something which has the effect of making the operating arms 14 move apart outward. The pinching arms 12 therefore pivot inward and perfectly pinch the object that is to be shaped.

An alternative embodiment of the present invention consists in attaching the pincher elements to the displaceable support 20 and in forming a frustoconical guide surface in the interior wall of the head 10. The displacement of the support 20 with respect to the head 10 causes the pinching arms to open or to close, depending on the direction of said displacement. It goes without saying that in this alternative form, the operating arm 14 is located on the same side as the pinching arm 12.

It is also clearly understood that the embodiments illustrated in the appended drawings are nonlimiting examples; various variations can be made by the person skilled in the art without departing from the scope of the invention.

What is claimed is:

1. A rotatable work head for a machine for shaping objects in a centered position, comprising:

a hollow body (10) having a first end and second end and defining a length herebetween an internal wall and a longitudinal axis, an operating member (20) which is mounted to slide coaxially to said internal wall via a bushing means (24, 26) at the first and second ends, said operating member having a passageway, said passageway is inside said hollow body, which is completely hollow to allow passage of an object to be shaped, and which has an external wall;

a guide surface (22) on one of said internal wall and said external wall; and a plurality of pincher elements for gripping the objects to be shaped, each made of a single monolithic piece, which are arranged with respect to said guide surface in order to rest thereon in such a manner that an axial relative displacement between said body and said operating member actuates a simultaneous opening or closing of all of said pincher elements concentrically with respect to said longitudinal axis of said hollow body, the object to be shaped being perfectly centered by the closing of pincher elements.

2. The work head according to claim 1, wherein the pincher elements are attached to the body of the rotatable work head, and wherein the slidable operating member (20) carries said guide surface (22) at one end of said external wall of said operating member.

3. The work head according to claim 1, wherein the pincher elements are attached to the slidable operating member (20), and wherein the hollow body carries said guide surface on said internal wall of said hollow body.

4. The work head according to claim 1, wherein each pincher element comprises a pincher arm and an operating arm which form a single piece.

5. The work head according to claim 4, wherein the operating arm of each pincher element is equipped with an adjusting element for adjusting a position of the pincher element.

6. The work head according to claim 1, wherein said operating member is loaded by a spring mounted inside said body of said head.

7. The work head, according to claim 1, which is in a holding bearing (32) which is fixed to the machine and which is located very close to the pincher elements.

8. The work head according to claim 1, which is removable from the machine as a single entity.

* * * * *